(12) United States Patent
Cabiles et al.

(10) Patent No.: US 9,811,296 B1
(45) Date of Patent: Nov. 7, 2017

(54) INFORMATION PROCESSING APPARATUS, IMAGE FORMING APPARATUS, AND IMAGE PROCESSING SYSTEM THAT ALL PERFORM IMAGE SYNTHESIZING

(71) Applicant: KYOCERA Document Solutions Inc., Osaka (JP)

(72) Inventors: Dinnel Cabiles, Osaka (JP); Michelle Tumulak, Osaka (JP); Maria Johanna Ybanez, Osaka (JP); Marie Stephanie Alesna, Osaka (JP); Roy Vincent Maranon, Osaka (JP); Eliot Emerson Uy, Osaka (JP); Franz Joseph Rara, Osaka (JP); Maurice James Sepe, Osaka (JP); Kenneth Kienzle Arrieta, Osaka (JP); Jay Luzares, Osaka (JP); Rule Lymen Lagumbay, Osaka (JP); Hazel Ozon, Osaka (JP); Gerald Galanida, Osaka (JP); J Mark Ramos, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/262,368

(22) Filed: Sep. 12, 2016

(30) Foreign Application Priority Data

Sep. 2, 2016 (JP) .................................. 2016-172163

(51) Int. Cl.
*G06K 15/00* (2006.01)
*G06F 3/12* (2006.01)

(52) U.S. Cl.
CPC .......... *G06F 3/1243* (2013.01); *G06F 3/1206* (2013.01); *G06F 3/128* (2013.01)

(58) Field of Classification Search
None
See application file for complete search history.

(56) References Cited

U.S. PATENT DOCUMENTS

2010/0238506 A1* 9/2010 Murakami ........ G06F 17/30011
358/1.16

FOREIGN PATENT DOCUMENTS

| JP | 07-264393 | * | 10/1995 | ............. H04N 1/387 |
| JP | 07264393 A | * | 10/1995 | |
| JP | H07-264393 A | | 10/1995 | |

* cited by examiner

*Primary Examiner* — Andrew H Lam
(74) *Attorney, Agent, or Firm* — IP Business Solutions, LLC

(57) ABSTRACT

An image forming apparatus includes: an image reading section, an operating section; a synthesizing region acceptance section that accepts, through the touch panel, specification of an object synthesizing region of a document image acquired by reading by the image reading section; an object acquiring section that acquires a plurality of objects to be individually synthesized in the object synthesizing region; and an image creating section that synthesizes each of object images representing the acquired objects in the object synthesizing region of the document image, thus creating, for the plurality of objects, individual outputting synthetic images containing the respective object images synthesized thereinto.

6 Claims, 15 Drawing Sheets

Fig.14
DC1
DC2
DC3

INFORMATION PROCESSING APPARATUS, IMAGE FORMING APPARATUS, AND IMAGE PROCESSING SYSTEM THAT ALL PERFORM IMAGE SYNTHESIZING

INCORPORATION BY REFERENCE

This application claims priority to Japanese Patent Application No. 2016-172163 filed on Sep. 2, 2016, the entire contents of which are incorporated by reference herein.

BACKGROUND

The present disclosure relates to a technique for processing an image of an original document to create a new document image.

As is so often the case with various types of notification forms, certificates and commendations, it is required to create a plurality of documents having different descriptions of the personal name or another particular item but sharing common descriptions of the remaining items. In this case, conventionally, using a common format having images corresponding to the descriptions of the remaining items, a text or image indicating an individually different personal name or particular item is inserted into the common format for each individual document to be created, thus creating a plurality of prints having different descriptions of the personal name or like item. In this relation, a technique is disclosed in which the format and printed character data both read by a scanner are synthesized and the resultant synthesized document is printed out.

SUMMARY

A technique improved over the aforementioned techniques is proposed as one aspect of the present disclosure.

An information processing apparatus according to an aspect of the present disclosure includes an image reading section, an operating section, a synthesizing region acceptance section, an object acquiring section, and an image creating section.

The image reading section reads a document image of an original document.

The operating section is a section through which instructions on various operations are entered by a user.

The synthesizing region acceptance section accepts, based on an instruction entered through the operating section, specification of an object synthesizing region in the document image obtained by the reading of the original document by the image reading section, the object synthesizing region being a region of the document image in which an object is to be synthesized.

The object acquiring section acquires a plurality of the objects to be individually synthesized in the object synthesizing region.

The image creating section synthesizes each of object images representing the plurality of objects acquired by the object acquiring section in the object synthesizing region of the document image the specification of which has been accepted by the synthesizing region acceptance section, thus creating, for the plurality of objects, individual outputting synthetic images containing the respective object images synthesized thereinto.

BRIEF DESCRIPTION OF THE DRAWINGS

FIG. 3 is a view showing a paper of a predetermined format on which a necessary item is to be, but not yet, filled in.

FIG. 14 is a view showing exemplary prints of outputting synthetic images created by the image forming apparatus.

DETAILED DESCRIPTION

Figure 1:
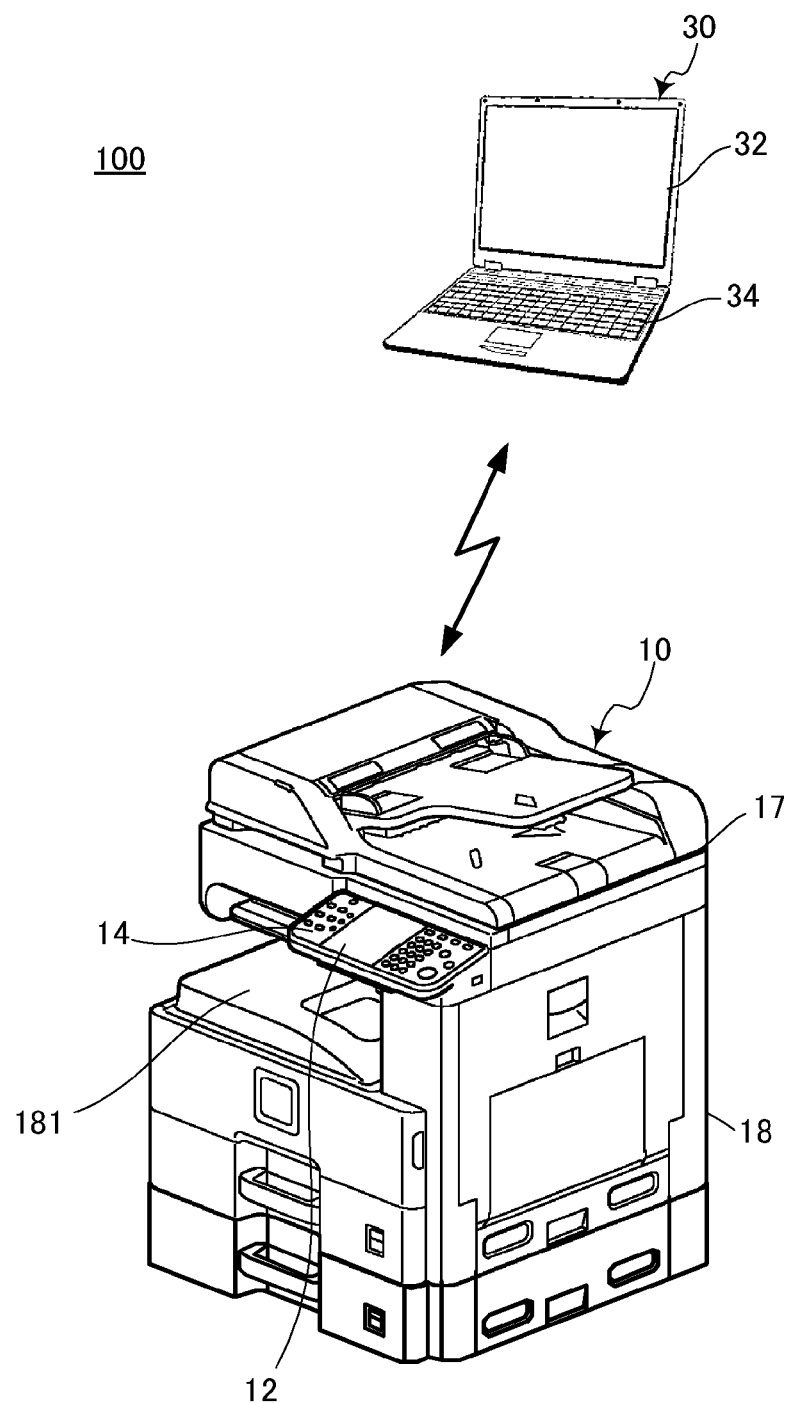
FIG. 1 is a perspective view showing the appearances of an image forming apparatus and a second information processing apparatus in an image processing system according to an embodiment of the present disclosure.
Figure 2A:
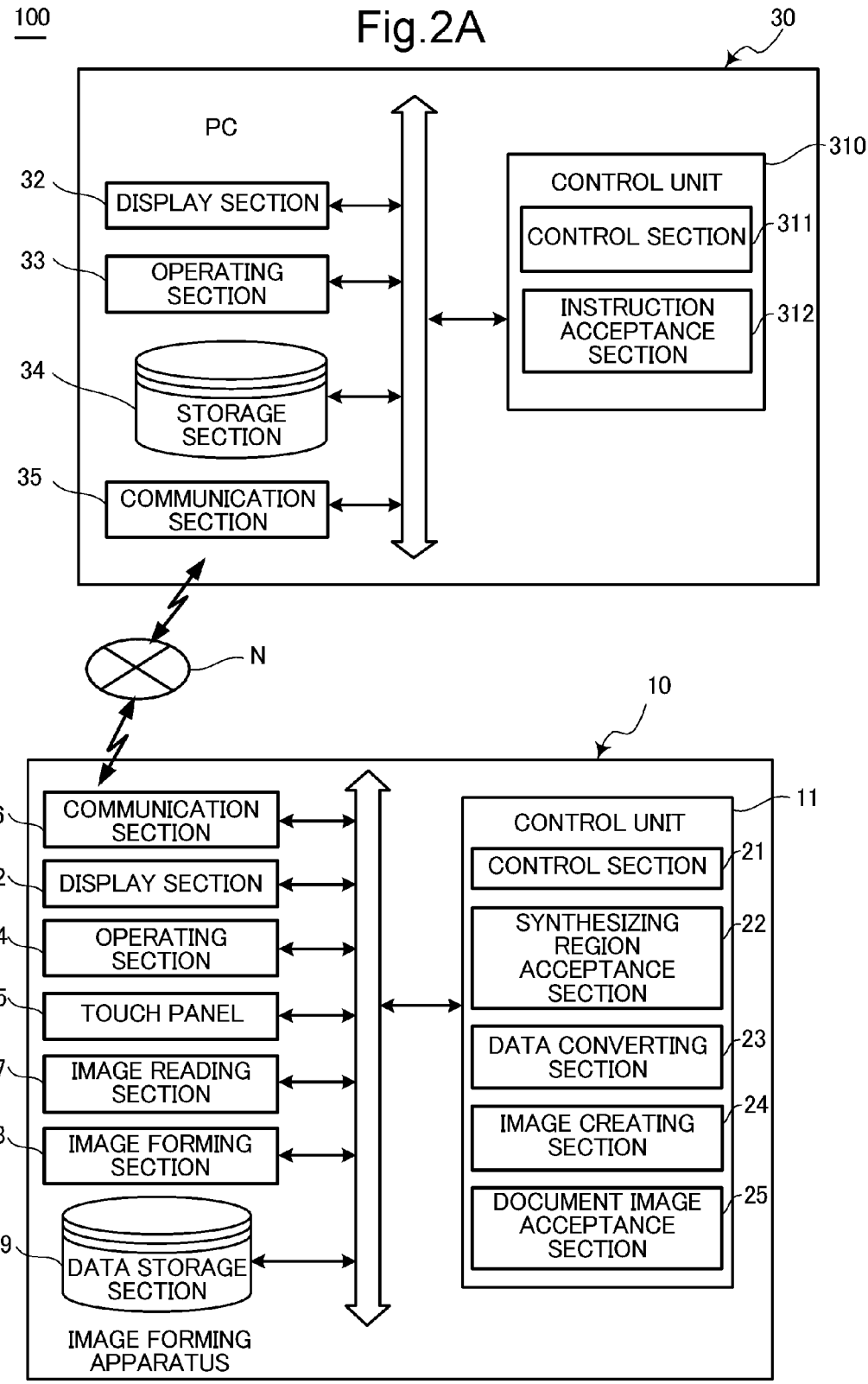
FIG. 2A is a block diagram showing the configurations of the image forming apparatus and the second information processing apparatus in the image processing system according to the above embodiment.

Hereinafter, a description will be given of an information processing apparatus, an image forming apparatus, and an image processing system, all according to one embodiment of the present disclosure, with reference to the drawings. FIG. 1 is a perspective view showing the appearances of the image forming apparatus and the second information processing apparatus in the image processing system according to the embodiment of the present disclosure. FIG. 2A is a block diagram showing the configurations of the image forming apparatus and the second information processing apparatus in the image processing system according to the embodiment.

The image processing system 100 according to this embodiment includes an image forming apparatus 10 and a personal computer (hereinafter referred to as a PC) 30.

The image forming apparatus 10 includes a control unit 11, a display section 12, an operating section 14, a touch panel 15, a communication section 16, an image reading section 17, an image forming section 18, and a data storage section 19. These components are capable of data or signal transfer via a bus among them. The image forming apparatus 10 is an example of the information processing apparatus defined in What is claimed is.

The image reading section 17 is, for example, a CCD serving as a scanner for optically reading an original document and has the function of generating image data representing an image of the original document. Furthermore, the image reading section 17 is a general reader for reading an original document being conveyed by an auto document feeder or an original document placed on a flatbed.

The image forming section 18 uniformly charges the surface of each photosensitive drum, exposes the surface of the photosensitive drum to form an electrostatic latent image on the surface of the photosensitive drum, develops the electrostatic latent image into a toner image, transfers the toner image (the image) on the surface of the photosensitive drum to a recording paper sheet, and fixes the toner image on the recording paper sheet. For example, the image forming section 18 prints on the recording paper sheet a document image obtained by reading of the original document by the image reading section 17.

The display section 12 is formed of a liquid crystal display (LCD), an organic light-emitting diode (OLED) display or the like.

The operating section 14 is designed to accept entry of instructions on various operations from a user and includes various keys, such as a menu key for calling up a menu, arrow keys for moving the focus of a GUI forming the menu, a determination key for performing a determination operation for the GUI forming the menu, and a start key.

The communication section 16 is a communication interface including a communication module and has the function of sending and receiving data to and from the PC 30 via a network N formed of a LAN, a public line or the like.

The data storage section 19 is a large storage device, such as an HDD (hard disk drive). The data storage section 19 stores, as forms for use in creating outputting synthetic images to be described hereinafter, individual document images obtained by reading of original documents by the image reading section 17. In doing so, the data storage section 19 stores the document images in association with their respective object synthesizing regions the specification of which has been accepted for each document image by a synthesizing region acceptance section 22.

The control unit 11 is formed of a processor, a RAM (random access memory), a ROM (read only memory), and so on. The processor is, for example, a CPU (central processing unit), an MPU or an ASIC. When a control program stored in the above data storage section 19 is executed by the above processor, the control unit 11 functions as a control section 21, a synthesizing region acceptance section 22, a data converting section 23, an image creating section 24, and a document image acceptance section 25. Alternatively, each of the control section 21, the synthesizing region acceptance section 22, the data converting section 23, the image creating section 24, and the document image acceptance section 25 of the control unit 11 may not be implemented by the operation of the control unit 11 in accordance with the above control program but may be constituted by a hardware circuit.

The control section 21 governs the overall operation control of the image forming apparatus 10.

The synthesizing region acceptance section 22 accepts, based on an instruction entered through the operating section 14, the specification of an object synthesizing region in a document image obtained by the reading of an original document by the image reading section 17. The object synthesizing region is a region of the document image in which an object image representing a below-described object is to be synthesized. When the user specifies a region of a desired size at a desired location of the document image where he/she wants to synthesize an object image (which will be described hereinafter in detail) using the function of the touch panel 15 (an example of the operating section defined in What is claimed is), the location and the specified region are accepted as the object synthesizing region by the synthesizing region acceptance section 22.

Figure 2B:
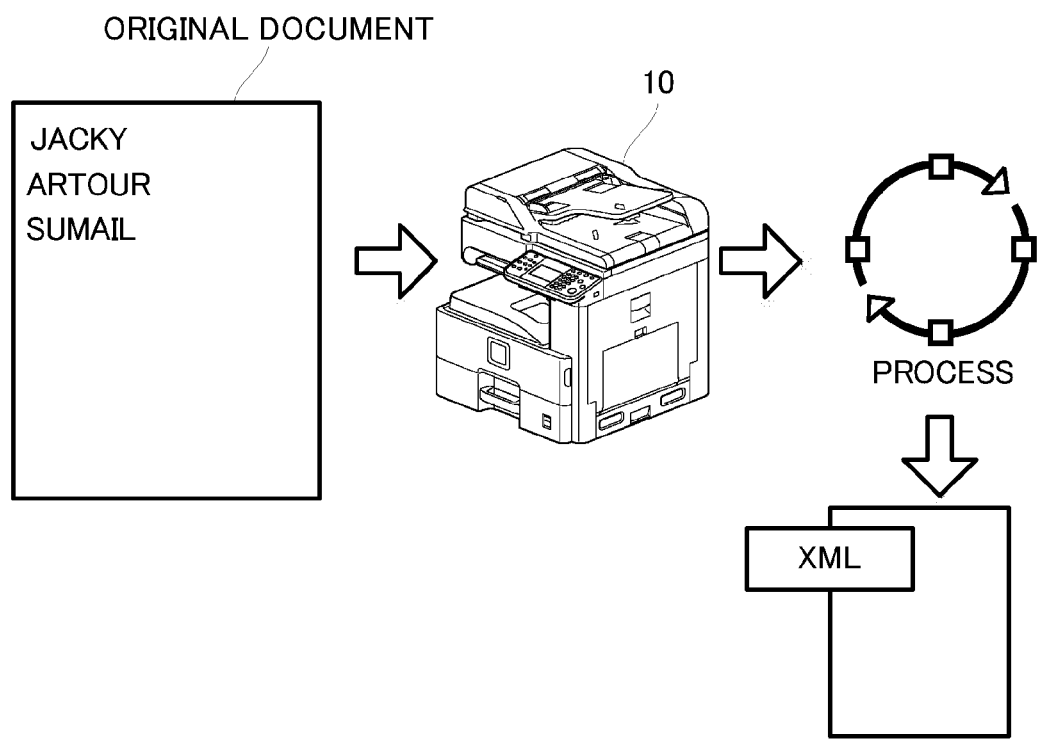
FIG. 2B is a diagram conceptually showing how to allow an image reading section to read an original document in which objects are described.

The data converting section (an example of the object acquiring section) 23 subjects an image read by the image reading section 17 to OCR conversion to obtain character data and acquires the obtained character data as an object or objects. For example, as shown in FIG. 2B, when the user allows the image reading section 17 to read an original document containing objects described therein, the data converting section 23 subjects an image obtained by the reading to OCR conversion to obtain the objects as pieces of text data and further converts the pieces of text data to pieces of XML data. The pieces of data indicating the objects converted to pieces of XML data are stored as pieces of object information in the data storage section 19. Each piece of object information is stored in the data storage section 19 by associating it with a document image with which an object image generated from it is to be synthesized.

The image creating section 24 generates object images from objects stored in the data storage section 19 or pieces of object information received by the communication section 16 and synthesizes the object images individually in an object synthesizing region of the document image the specification of which has been accepted by the synthesizing region acceptance section 22, thus creating individual outputting synthetic images.

The document image acceptance section 25 accepts the specification of a document image serving as a form for use in creating the outputting synthetic images by object synthesis. When a plurality of original documents are read by the image reading section 17 to obtain a plurality of document images as forms described above, the data storage section 19 stores the individual document images as forms. Furthermore, when a plurality of document images are obtained by reading of original documents by the image reading section 17 and individual object synthesizing regions are specified for the respective document images by user's operation of the operating section 14, the synthesizing region acceptance section 22 accepts the individual object synthesizing regions specified for the respective document images and the data storage section 19 stores each document image in association with its specific object synthesizing region for the document image. The document image acceptance section 25 accepts user's specification of a desired document image for use as the form among the above plurality of document images.

The image creating section 24 retrieves from the data storage section 19 a document image indicated by the specification accepted by the document image acceptance section 25 and pieces of object information associated with the document image and synthesizes object images generated from the pieces of object information in the object synthesizing region of the retrieved document image.

On the other hand, the PC 30 includes a control unit 310, a display section 32, an operating section 33, a storage section 34, and a communication section 35. These components are capable of data or signal transfer via a bus among them. The PC 30 is an example of the second information processing apparatus defined in What is claimed is.

The display section 32 is formed of an LCD, an OLED display or the like.

The operating section 33 is a section through which instructions on various operations are entered by the user and is composed of a keyboard, a pointing device, and so on.

The communication section 35 is a communication interface including a communication module and performs data communication via a network N formed of a LAN, a public line or the like. The communication section 35 sends, for example, objects the specification of which has been accepted by an instruction acceptance section 312 and which have been converted to pieces of XML data.

The storage section 34 is a large storage device, such as an HDD.

The control unit 310 is formed of a processor, a RAM, a ROM, and so on. The processor is, for example, a CPU, an MCU or an ASIC. When a control program stored in the storage section 34 is executed by the above processor, the control unit 310 functions as a control section 311 and an instruction acceptance section 312. Alternatively, each of the control section 311 and the instruction acceptance section 312 of the control unit 310 may not be implemented by the operation of the control unit 310 in accordance with the above control program but may be constituted by a hardware circuit.

The control section 311 governs the overall operation control of the PC 30. The control section 311 has the function of controlling the communication operation of the communication section 35. For example, the communication section 35 sends and receives, under the control of the control section 311, data to and from the image forming apparatus 10 via a LAN. Furthermore, the control section 311 controls the display section 32 to allow various types of windows and so on to be displayed on the screen of the display section 32.

The instruction acceptance section 312 accepts, based on user's operation of the operating section 33, an instruction to specify an object or objects for use in creating an outputting synthetic image or images. The object is data formed of a text, an image or others to be synthesized with a document image serving as the form. Furthermore, the instruction acceptance section 312 also accepts, based on user's operation of the operating section 33, an instruction to specify a document image with which the specified object or objects are to be synthesized.

In the image forming apparatus 10 of the image processing system 100 of this embodiment, the image reading section 17 reads a paper of a predetermined format (such as various types of notification forms, certificates or commendations) on which a necessary item is to be, but not yet, filled in, and the data storage section 19 stores a document image obtained by the above reading as a form for use in creating outputting synthetic images. In other words, the paper is used to create a plurality of documents in which only the descriptions of the personal name or title are different but the descriptions of the remaining items are shared. The paper will be described below.

Figure 3:
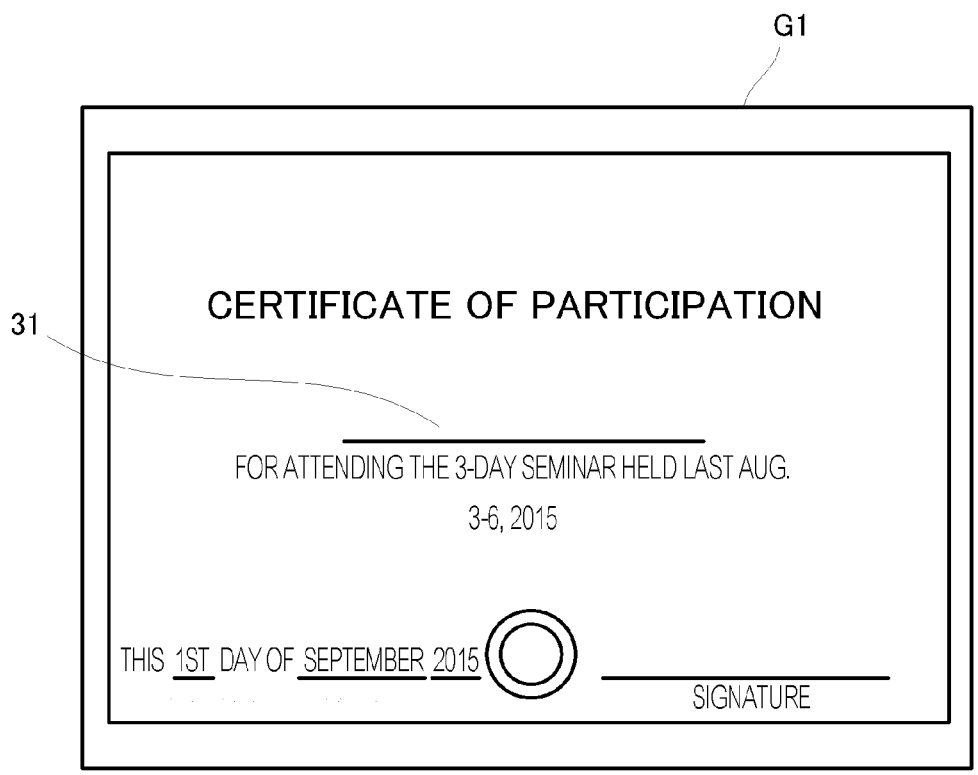

FIG. 3 is a view showing a paper (hereinafter referred to as an original document) G1 of a predetermined format on which a necessary item is to be, but not yet, filled in. In this embodiment, a certificate of participation in a seminar is used as an example of the original document G1. The original document G1 contains an entry column 31. The entry column 31 is a column where a participant's name is to be filled in.

Figure 4:
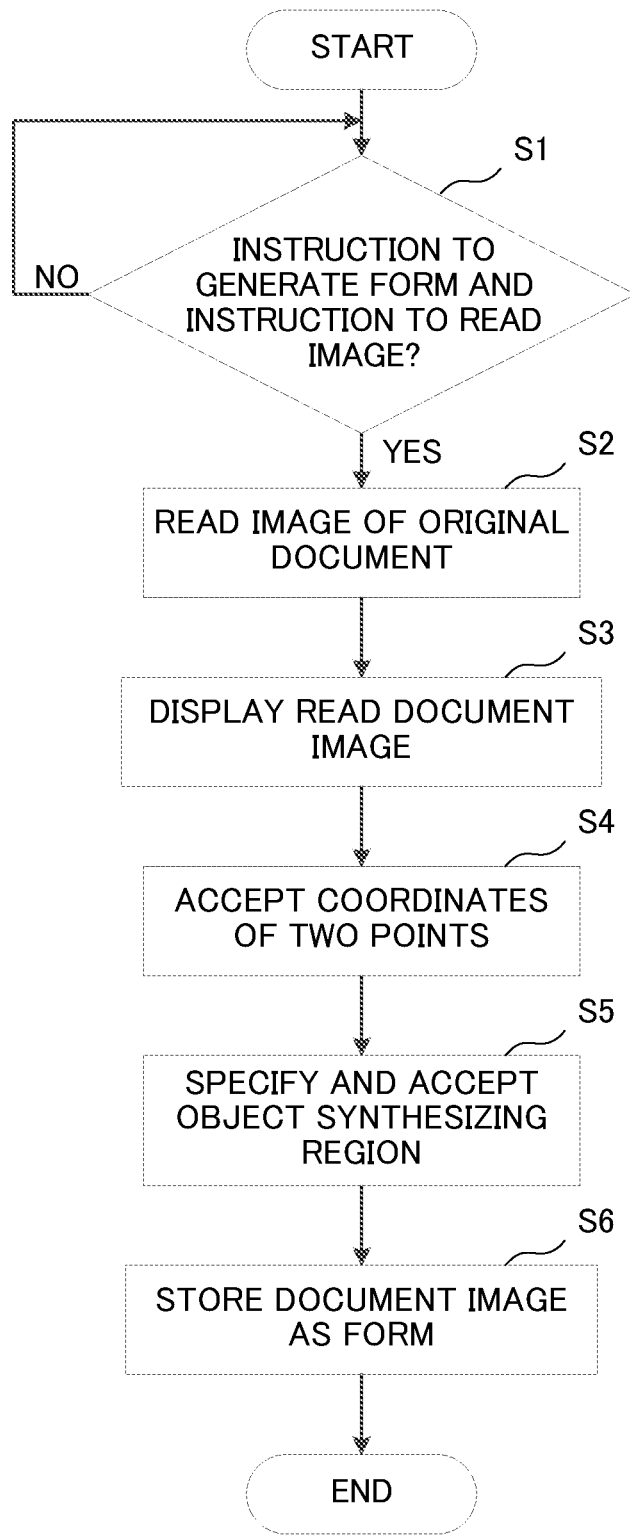
FIG. 4 is a flowchart showing processing of the image forming apparatus for generating a form for use in creating outputting synthetic images.

Next, a description will be given of processing of the image forming apparatus 10 for generating a form for use in creating outputting synthetic images (to be described hereinafter). FIG. 4 is a flowchart showing the processing of the image forming apparatus 10 for generating a form for use in creating outputting synthetic images.

For example, when the user places an original document G1 in the image reading section 17, an instruction to start generating a document image as the form is entered by user's operation of the operating section 14, and in this state an instruction to perform the reading of an image of the original document G1 is entered through the operating section 14 (YES in S1), the control section 21 allows the image reading section 17 to read the original document G1 (S2).

Figure 5:
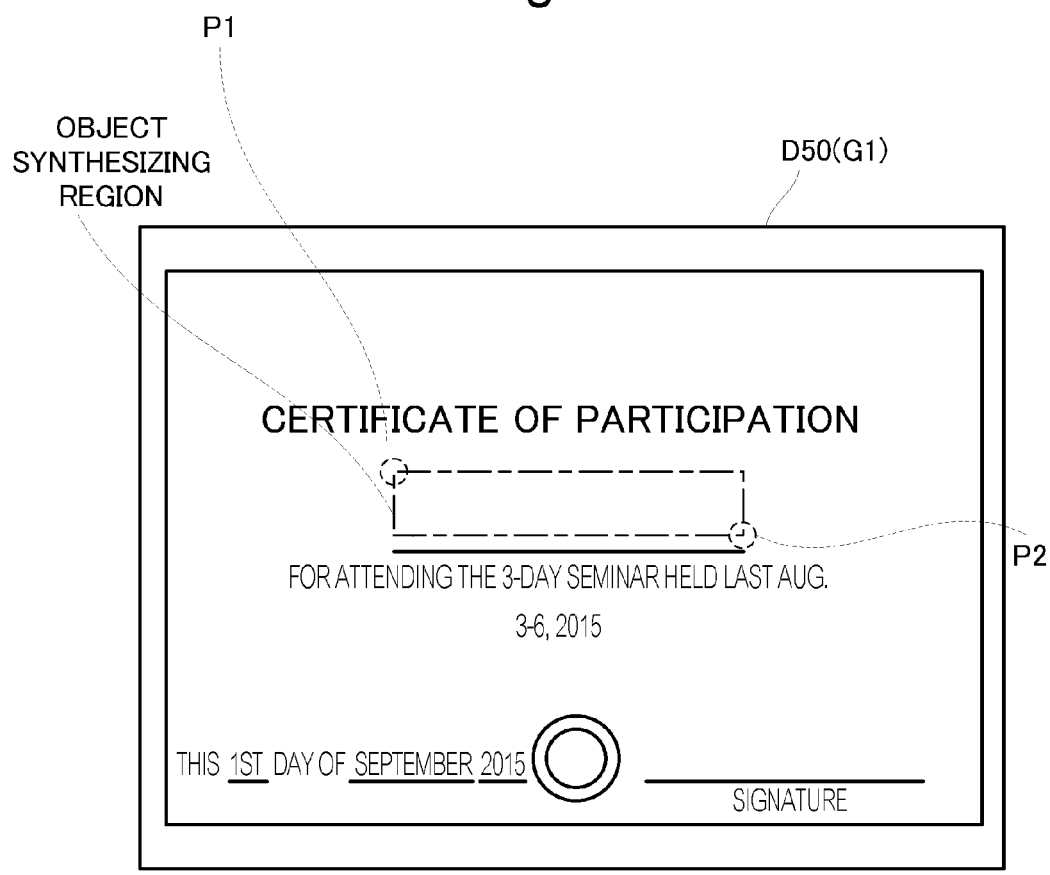
FIG. 5 is a view showing an example of a display screen displayed on a display section of the image forming apparatus.

When a document image of the original document G1 is generated by the reading of the image reading section 17, the control section 21 allows the display section 12 to display the document image (S3, see FIG. 5). When during display of the document image the user makes touch gestures on the display screen of the display section 12 by touching two points P1, P2 on the display screen D50 as shown in FIG. 5, the touch panel 15 accepts coordinates of the two points on the display screen (S4). The synthesizing region acceptance section 22 accepts as an object synthesizing region a rectangular region having a diagonal line through the two points and the location of the rectangular region (S5). For example, the user sets the location corresponding to the entry column 31 of the original document G1 as an object synthesizing region by the above operation.

When thus the reading of the original document G1 and the specification of the object synthesizing region are completed, the control section 21 allows the data storage section 19 to store the document image of the original document G1 as a form for use in creating outputting synthetic images by associating the document image with the object synthesizing region the specification of which has been accepted in S5 (S6).

In the case where the pieces of processing in S1 to S5 are performed for each of a plurality of original documents, thus completing the reading of the documents and the specification of their respective object synthesizing regions, the control section 21 allows the data storage section 19 to store the document images of the plurality of original documents as individual forms by associating them with their respective object synthesizing regions. In doing so, the control section 21 allows the data storage section 19 to store the plurality of document images by assigning them to their respective identification numbers, such as a document image DOC1, a document image DOC2, and a document image DOC3.

Figure 6:
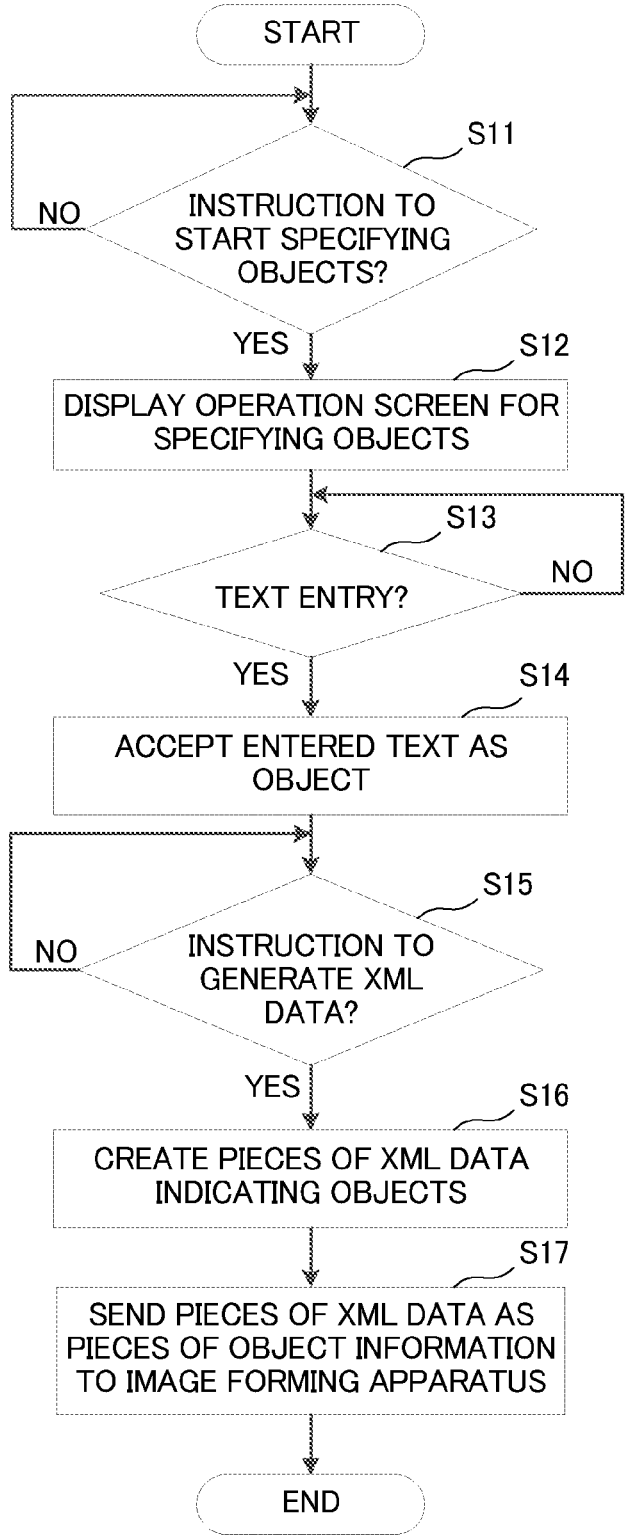
FIG. 6 is a flowchart showing processing of a PC for specifying objects.

Next, a description will be given of processing of the PC 30 for specifying objects for use in creating outputting synthetic images. FIG. 6 is a flowchart showing the processing of the PC 30 for specifying objects.

Figure 7:
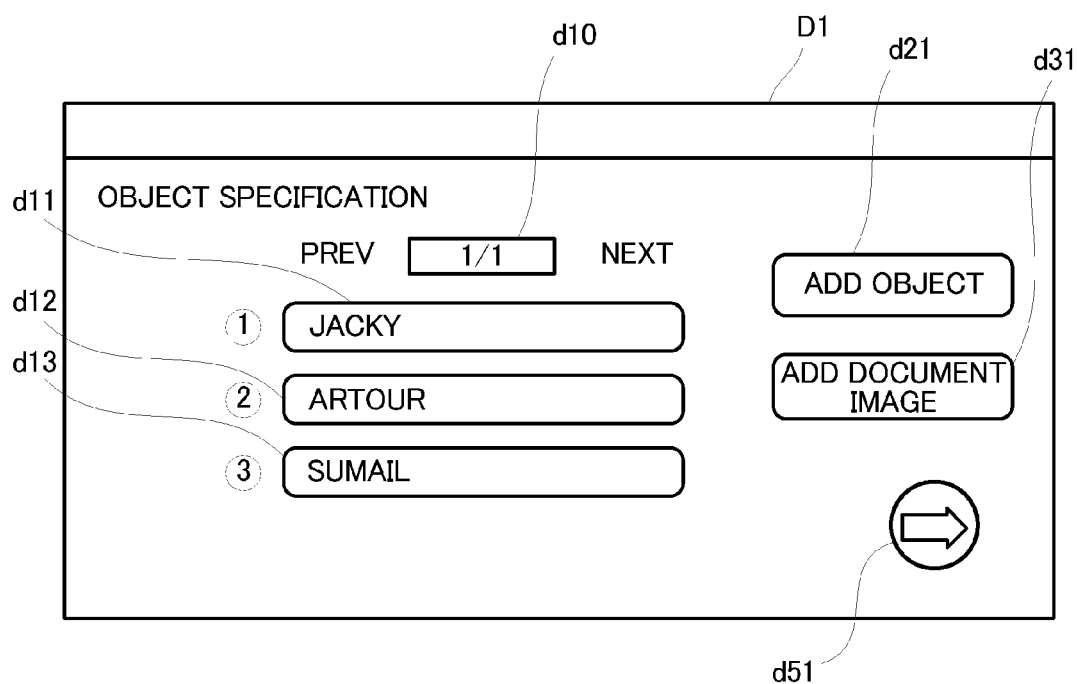
FIG. 7 is a view showing an example of an operation screen displayed on a display section of the PC.

When the user enters an instruction to start specifying objects through the operating section 33 of the PC 30 (YES in S11), the control section 311 allows the display section 32 to display an operation screen D1 as shown as an example in FIG. 7 (S12). This operation screen D1 is a screen for accepting various instructions necessary for specifying objects. The operation screen D1 includes images for accepting various instructions.

During display of the display screen D1, a screen for specifying objects for the above document image DOC1 is displayed based on a default configuration of the control section 311. The control section 311 allows the identification number of the document image being subject to object specification to be displayed in the document image designation field d10 of the operation screen D1. In the operation screen D1 of this example, "1/1" is displayed, in the document image designation field d10, as an image indicating the "document image DOC1" being subject to object specification. In the fraction "1/1", the denominator indicates the number of document images subject to object specification and the numerator indicates an identification number assigned to the document image currently used for object specification ("1" of "DOC1" in this example). The operation screen D1 further includes object entry fields d11 to d13.

When during display of this operation screen D1 the user selects the object entry field d11 by the operation of the operating section 33 and then enters thereinto, for example, a text for use as an object (YES in S13), the instruction acceptance section 312 accepts the text as an object to be synthesized in the object synthesizing region (S14). Likewise, when the user performs the same operation for the object entry fields d12, d13, the instruction acceptance section 312 accepts the entered texts as objects to be synthesized in the object synthesizing region of the document image DOC1.

For example, when the user operates the operating section 33 to enter JACKY into the object entry field d11, enter ARTOUR into the object entry field d12, and enter SUMAIL into the object entry field d13, the instruction acceptance section 312 accepts these texts as objects to be synthesized in the object synthesizing region of the document image DOC1 and concurrently accepts an instruction to use the document image DOC1 for each of these entered objects.

Figure 8:
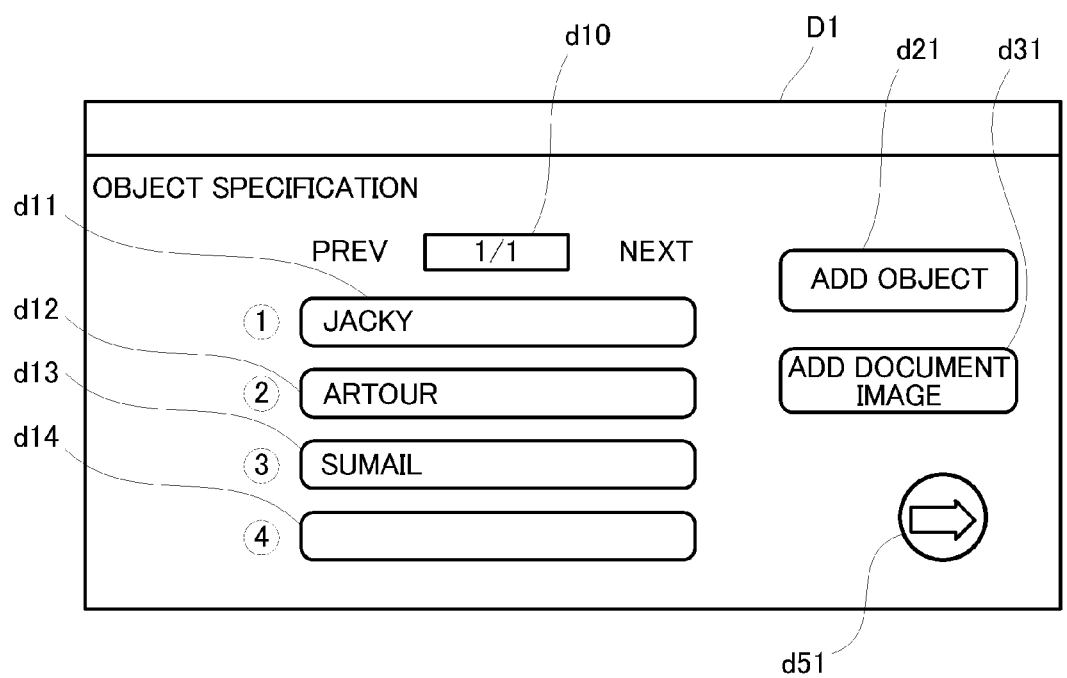
FIG. 8 is a view showing another example of the operation screen displayed on the display section of the PC.

When the user operates the operating section 33 to select an ADD OBJECT button d21, the control section 311 accepts an instruction to add an object to be synthesized in the object synthesizing region of the document image DOC1 and, as shown as an example in FIG. 8, allows an additional object entry field d14 to be displayed on the operation screen D1. When the user also performs the same operation for the object entry field d14 as done for the object entry field d11, the instruction acceptance section 312 accepts the entered text as an object to be synthesized in the object synthesizing region of the document image DOC1.

Figure 9:
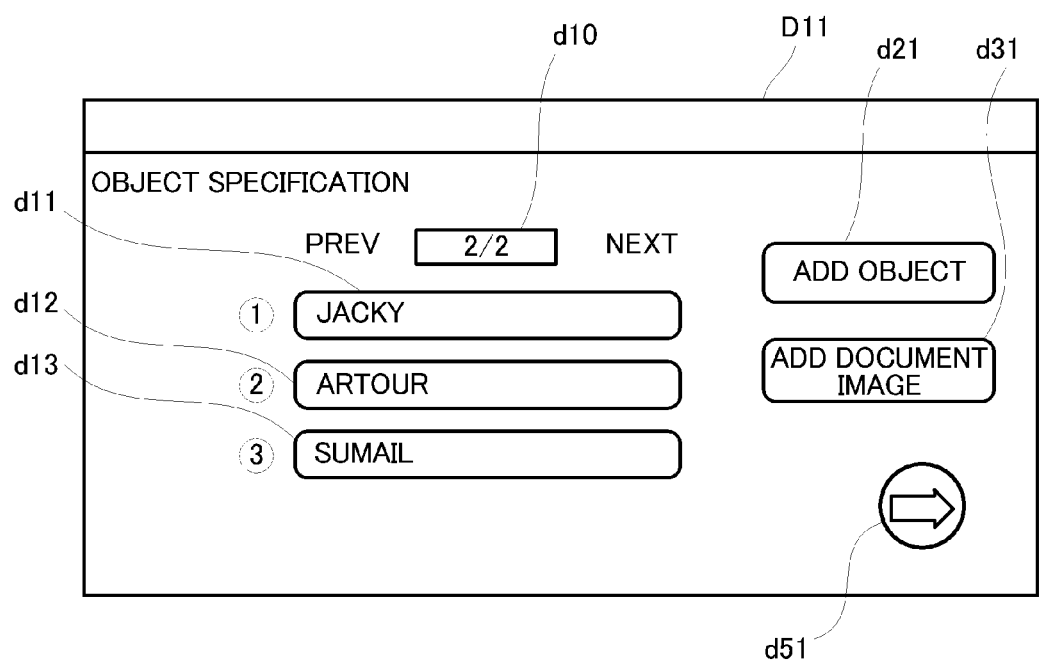
FIG. 9 is a view showing still another example of the operation screen displayed on the display section of the PC.

When in order to perform the above-described object specification for another document image, for example, the document image DOC2, the user selects an image of an ADD DOCUMENT IMAGE button d31, the control section 311 allows the display section 32 to display a new operation screen D11 as shown as an example in FIG. 9.

In this case, the control section 311 allows "2/2" to be displayed, in the document image designation field d10 of the operation screen D11, as an image indicating the "document image DOC2" which is another document being subject to object specification. In the fraction "2/2", the denominator indicates the number of document images subject to object specification and the numerator indicates an identification number assigned to the document image currently used for object specification ("2" of "DOC2" in this example). The operation screen D11 has the same configuration as the operation screen D1 except for the display contents of the document image designation field d10. The operation screen D11 also includes the object entry fields d11 to d13. The instruction acceptance section 312 accepts, based on the same operation as done for the operation screen D1, the specification of objects to be synthesized in the object synthesizing region of the document image DOC2.

When the user selects a data generation button d51 of the operation screen D1 or D11 after the objects to be synthesized in the object synthesizing region of the document image are specified, an instruction to generate XML data is entered (YES in S15). The instruction acceptance section 312 accepts this generation instruction and generates pieces of XML data indicating the accepted respective objects (S16). Each piece of XML data generated by the instruction acceptance section 312 is sent as a piece of object information indicating an object for use in creating an outputting synthetic image, together with identification information indicating the document image to which the piece of object information is to be applied, to the image forming apparatus 10 by the communication section 35 (S17). A combination of the instruction acceptance section 312 and the communication section 35 is an example of the object sending section.

In the image forming apparatus 10, the communication section 16 serves as the object acquiring section to receive the pieces of object information and the identification information and the control section 21 allows the data storage section 19 to store the pieces of object information in association with the document image indicated by the identification information.

In the image processing system 100, a mobile device 60, such as a smartphone, can be applied as the second information processing apparatus instead of the PC 30. A description will be given below of processing for specifying objects using the mobile device 60 as the second information processing apparatus. The configuration of the mobile device 60 is substantially the same as that of the PC 30 shown in FIG. 2A, but a memory is used as the storage section 34 instead of an HDD. Furthermore, the operations for an operation screen D2 which the control section 311 allows the display section 32 of the mobile device 60 to display are substantially the same as those for the operation screen D1 displayed on the display section 32 of the PC 30.

Figure 10:
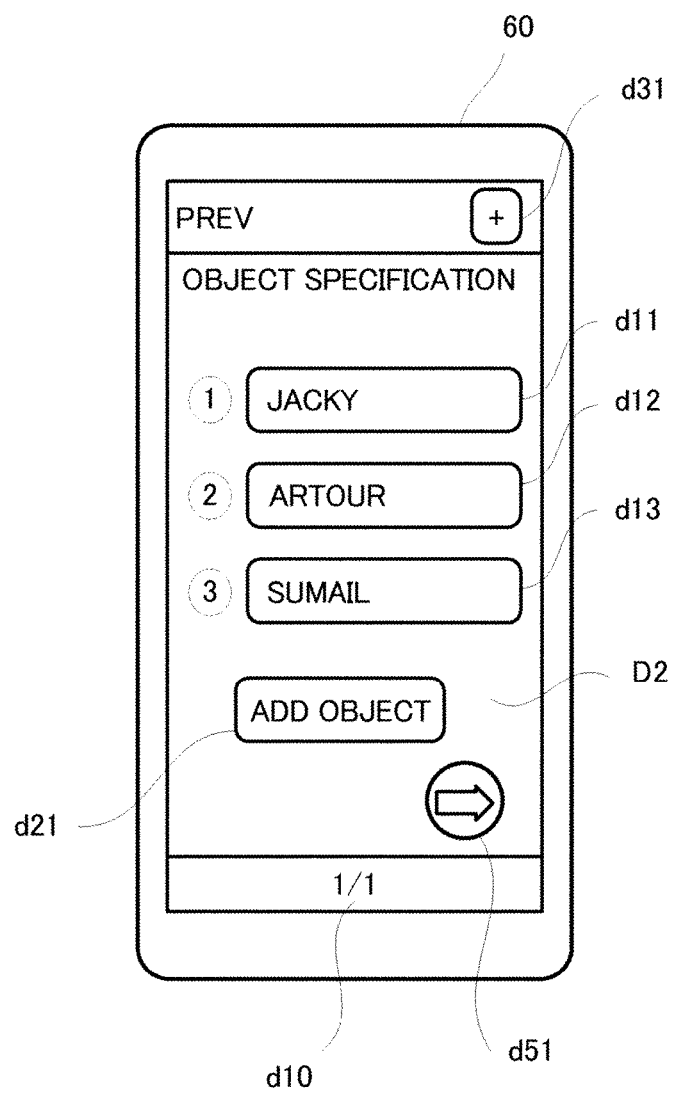
FIG. 10 is a view showing an example of an operation screen displayed on a display section of a mobile device.

When the user enters an instruction to start specifying objects through the operating section 33 of the mobile device 60, the control section 311 allows the display section 32 to display an operation screen D2 as shown as an example in FIG. 10.

The operation screen D2 is, in default configuration, a screen for specifying objects for the above document image DOC1. The operation screen D2 includes images for accepting instructions, such as a document image designation field d10, object entry fields d11 to d13, an ADD OBJECT button d21, an ADD DOCUMENT IMAGE button d31, and a data generation button d51. In relation to various operations through the operation screen D2, operations for the images for accepting instructions can be effected by user's touch gestures at display positions of the images for accepting instructions on the operation screen D2. In the mobile device 60, user's touch gestures on the images for accepting instructions can be detected by a touch panel function incorporated in the display section 32. The mobile device 60 performs the same pieces of processing as with the PC 30 based on the same operations as with the PC 30. When in the image forming apparatus 10 the communication section 16 serving as the object acquiring section receives the pieces of object information and the identification information from the mobile device 60, the control section 21 allows the data storage section 19 to store the pieces of object information in association with the document image indicated by the identification information.

As thus far descried, there are a plurality of means by which objects are acquired by the image forming apparatus 10: acquisition by the data converting section 23, acquisition from the PC 30 by the communication section 16, and acquisition from the mobile device 60 by the communication section 16. Any of these means allows the image forming apparatus 10 to acquire objects.

Figure 11:
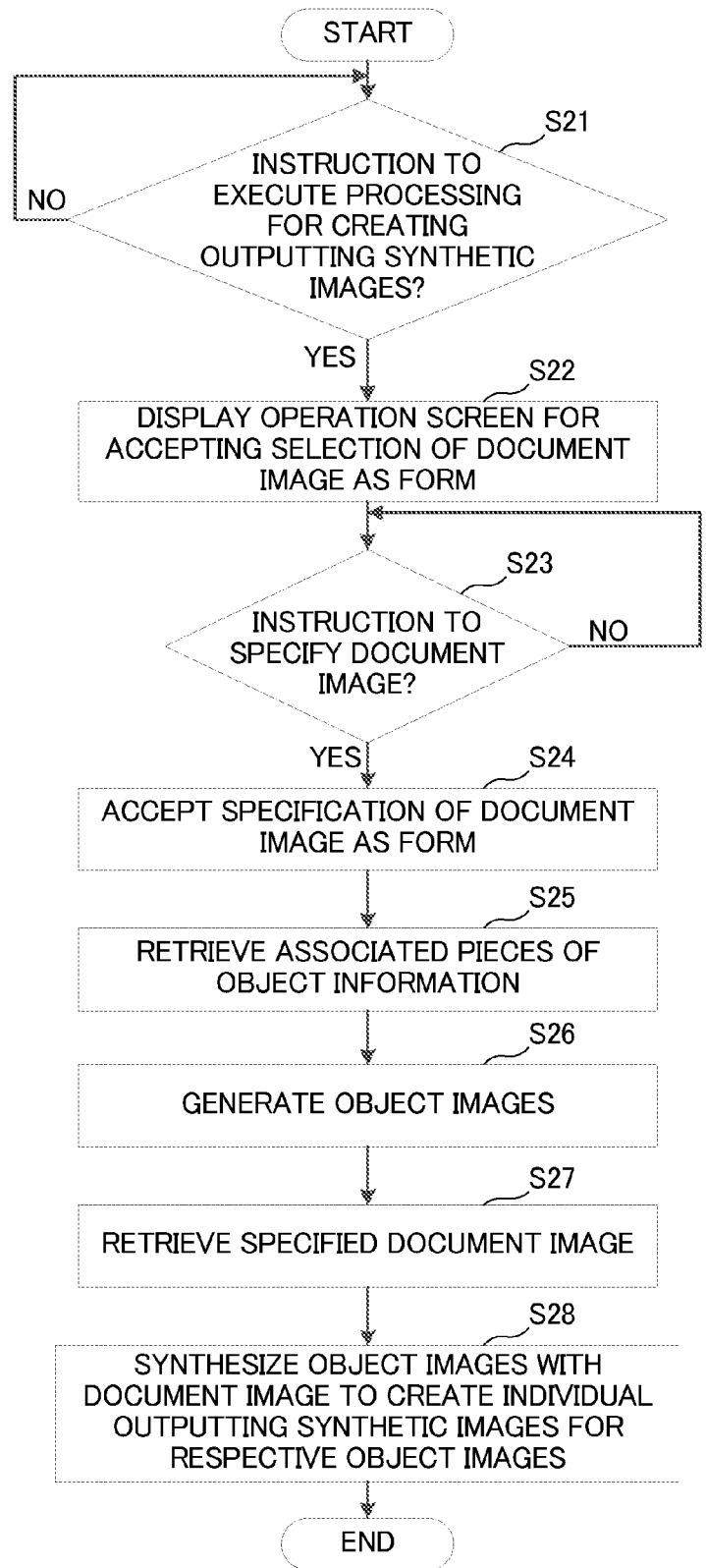
FIG. 11 is a flowchart showing processing of the image processing system for printing a plurality of certificates of participation in seminar in which only the descriptions of the personal name are different from each other.

Next, a description will be given of processing of the image processing system 100 for printing a plurality of certificates of participation in seminar in which only the descriptions of the personal name are different from each other. FIG. 11 is a flowchart showing this processing.

Figure 12:
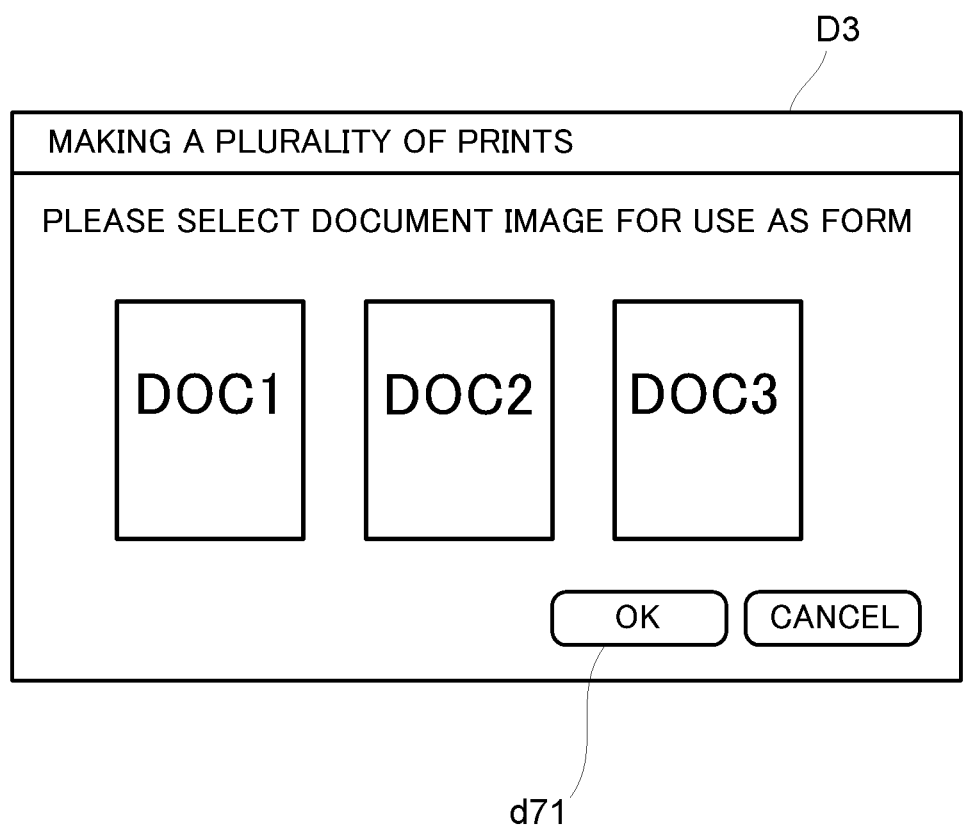
FIG. 12 is a view showing an example of another display screen displayed on the display section of the image forming apparatus.

When in the image forming apparatus 10 an instruction to execute the processing for creating outputting synthetic images is entered by user's operation of the operating section 14 (YES in S21), the control section 21 allows the display section 12 to display an operation screen D3 as shown as an example in FIG. 12 (S22). The operation screen D3 is a screen for accepting from the user the selection of a document image for use in creating outputting synthetic images. The operation screen D3 includes a message that guides processing to be executed, such as "MAKING A PLURALITY OF PRINTS", images DOC1 to DOC3 indicating document images stored as forms in the data storage section 19, and an OK button d71.

When during display of the operation screen D3 the user makes a touch gesture on, among the images DOC1 to DOC3 displayed on the operation screen D3, an image representing a desired document image for use in creating outputting synthetic images and further makes a touch gesture on the OK button d71 (YES in S23), the document image associated with the image displayed at the position where the touch gesture has been made is accepted as a form for use in creating the outputting synthetic images through the touch panel 15 by the document image acceptance section 25 (S24).

Subsequently, the image creating section 24 retrieves from the data storage section 19 pieces of object information stored in association with the accepted document image (S25) and generates, from the pieces of object information in the form of XML data, object images having the same data format (for example, jpeg) as the document image (S26). For example, if the contents of the objects indicated by the pieces of object information are three words: JACKY, ARTOUR, and SUMAIL, the image creating section 24 generates three respective object images representing JACKY, ARTOUR, and SUMAIL.

Then, the image creating section 24 retrieves the document image accepted in S24 from the data storage section 19 (S27) and synthesizes each of the object images generated in S26 in the object synthesizing region of the document image to thereby create, for the plurality of objects, individual outputting synthetic images containing the respective object images synthesized thereinto (S28).

Figure 13:
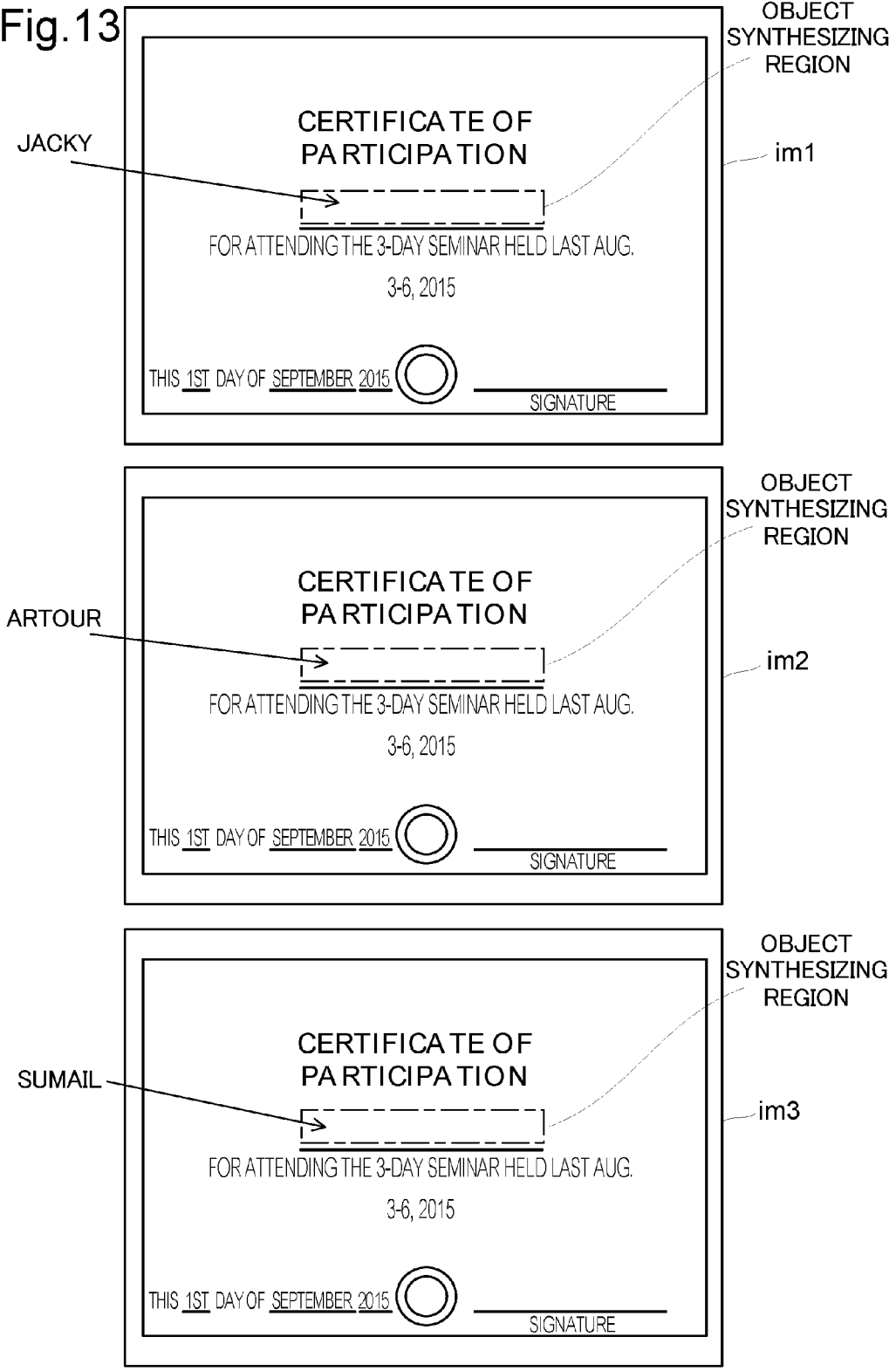
FIG. 13 is a view conceptually showing how to assign each of object images to a document image.

In this example, since the number of objects used are three: JACKY, ARTOUR, and SUMAIL, the image creating section 24 creates, as shown as an example in FIG. 13, an outputting synthetic image im1 in which an object image representing JACKY is synthesized in the object synthesizing region of the retrieved document image, an outputting synthetic image im2 in which an object image representing ARTOUR is synthesized in the object synthesizing region of the retrieved document image, and an outputting synthetic image im3 in which an object image representing SUMAIL is synthesized in the object synthesizing region of the retrieved document image.

The control section 21 allows the data storage section 19 to store the created outputting synthetic images (S27).

Furthermore, the control section 21 allows the image forming section 18 to form the created outputting synthetic images on individual recording paper sheets (S28). Thus, as shown as an example in FIG. 14, prints of certificates of participation in seminar are obtained, three in total, in which only the descriptions of the personal name are different but the descriptions of the remaining items are shared.

As seen from the above, in creating a plurality of prints having different descriptions of the personal name or like item but sharing the descriptions of the remaining items in accordance with the above embodiment, there is no need for the work for inserting a different text or image indicating a personal name or the like into a common format each time a print is created. Therefore, the burden on and the time for the work of printing a plurality of certificates of participation in seminar DC1, DC2, DC3 different only in the description of personal name, as shown as an example in FIG. 14, can be reduced.

For example, in a general technique of simply synthesizing a format and printed character data both read by a scanner with each other and printing out the synthesized document, the format and the printed character data can be synthesized with each other, but the time and effort required to create a plurality of prints in which only the descriptions of the personal name or like item are different but the descriptions of the remaining items are shared cannot be reduced.

In contrast, in accordance with the above embodiment, even the burden on and the time for the work of creating a plurality of documents in which only the descriptions of one item are different but the descriptions of the remaining items are shared can be reduced.

The present disclosure is not limited to the configurations of the above embodiment and can be modified in various ways. For example, in the image processing system 100 according to the above embodiment, an example is given where an image forming apparatus going so far as to form created outputting synthetic images on recording media is used as the information processing apparatus. However, if it is enough that outputting synthetic images can be created, a personal computer or the like can also be applied as the information processing apparatus according to the present disclosure.

The structure, configuration, and processing described in the above embodiment with reference to FIGS. 1 to 14 are merely illustrative and are not intended to limit the present disclosure to them.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An information processing apparatus comprising:
an image reading section that reads a document image of an original document;
an operating section through which instructions on various operations are entered by a user;
a communication section that performs data communication with another information processing apparatus and acquires a plurality of objects from the another information processing apparatus;
a synthesizing region acceptance section that accepts, based on an instruction entered through the operating section, specification of an object synthesizing region in the document image obtained by the reading of the original document by the image reading section, the object synthesizing region being a region of the document image in which the object is to be synthesized; and
an image creating section that synthesizes one of object images representing the plurality of objects acquired by the communication section in the object synthesizing region of the document image the specification of which has been accepted by the synthesizing region acceptance section, thus creating, for the plurality of objects, individual outputting synthetic images by performing, on all of the plurality of objects acquired by the communication section, synthetic image creation processing that creates an outputting synthetic image containing the one object image synthesized thereinto.

2. The information processing apparatus according to claim 1, further comprising:
a data storage section that stores a plurality of the document images obtained by the reading of a plurality of the original documents by the image reading section in association with their respective object synthesizing regions specification of which has been accepted for each of the document images by the synthesizing region acceptance section; and
a document image acceptance section that accepts specification of, among the plurality of document images stored in the data storage section, the document image to be synthesized with the object images,
wherein the image creating section retrieves from the data storage section the document image indicated by the specification accepted by the document image acceptance section and synthesizes each of the object images in the object synthesizing region of the retrieved document image.

3. The information processing apparatus according to claim 1, wherein the object acquiring section subjects an image read from an original document containing the object described therein by the image reading section to optical character recognition conversion to obtain character data and acquires the obtained character data as the object.

4. An image forming apparatus comprising:
the information processing apparatus according to claim 1;
an image forming section that forms an image on a recording medium; and
a control section that allows the image forming section to form the outputting synthetic images on the individual recording media.

5. An image processing system comprising the information processing apparatus according to claim 1 and a second information processing apparatus connected to and capable of communication with the information processing apparatus,
the second information processing apparatus comprising:
a second display section;
a second operating section through which instructions on various operations are entered by a user;
a second communication section that performs data communication;
a second control section that controls operation of the second display section; and
an instruction acceptance section that accepts, based on user's operation on the second operating section, an instruction to specify the object,
wherein the second control section allows the second display section to display, based on the user's operation on the second operating section, an object setting screen for accepting an input of the object, and
the instruction acceptance section accepts, when the object setting screen is displayed at the second display section, based on the operation of the second operating section, an instruction to specify the object, and the second communication section sends the object the instruction of which is accepted to the information processing apparatus,
wherein the communication section of the information processing apparatus receives the object sent from the second information processing apparatus.

6. The information processing apparatus according to claim 1, further comprising:
a display section provided with a touch panel; and
a control section that controls operation of the display section,
wherein the control section allows the display section to display the document image obtained by the reading of the original document by the image reading section,
the touch panel accepts, as the operating section, coordinates of two points on the region of the document image displayed on the display screen, the two points being specified by user's touching operation, and
the synthesizing region acceptance section accepts as the object synthesizing region a rectangular region having a diagonal line through the two points accepted by the touch panel, and the location of the rectangular region.

* * * * *